(12) United States Patent
Ise et al.

(10) Patent No.: US 9,196,885 B2
(45) Date of Patent: Nov. 24, 2015

(54) LAMINATION TYPE SECONDARY BATTERIES

(75) Inventors: Takeshi Ise, Sagamihara (JP); Takao Daidoji, Sagamihara (JP)

(73) Assignee: NEC ENERGY DEVICES, LTD., Kanagawa (JP)

( * ) Notice: Subject to any disclaimer, the term of this patent is extended or adjusted under 35 U.S.C. 154(b) by 48 days.

(21) Appl. No.: 13/578,196

(22) PCT Filed: Dec. 15, 2010

(86) PCT No.: PCT/JP2010/072546
§ 371 (c)(1),
(2), (4) Date: Aug. 9, 2012

(87) PCT Pub. No.: WO2011/099224
PCT Pub. Date: Aug. 18, 2011

(65) Prior Publication Data
US 2012/0321932 A1    Dec. 20, 2012

(30) Foreign Application Priority Data

Feb. 10, 2010    (JP) .................................. 2010-027055

(51) Int. Cl.
*H01M 10/04*    (2006.01)
*H01M 2/16*    (2006.01)
*H01M 10/0585*    (2010.01)

(52) U.S. Cl.
CPC ........ *H01M 2/1673* (2013.01); *H01M 10/0413* (2013.01); *H01M 10/0436* (2013.01); *H01M 10/0585* (2013.01); *Y02E 60/122* (2013.01)

(58) Field of Classification Search
CPC .......................................... H01M 2/14–2/1693
See application file for complete search history.

(56) References Cited

U.S. PATENT DOCUMENTS

2002/0119367 A1    8/2002    Watanabe et al.
2012/0177975 A1*    7/2012    Yageta ................ H01M 2/1673
                                                                    429/144

FOREIGN PATENT DOCUMENTS

JP    07-272761 A    10/1995
JP    10-188938 A    7/1998
(Continued)

OTHER PUBLICATIONS

JP 2003-017112 A English machine translation.*
(Continued)

*Primary Examiner* — Ula C Ruddock
*Assistant Examiner* — Scott J Chmielecki
(74) *Attorney, Agent, or Firm* — Sughrue Mion, PLLC (57) ABSTRACT

The present invention provides a lamination type secondary battery in which separators are prevented from becoming wrinkled and are free from laminating dislocation. An aspect of the present invention is a lamination type secondary battery in which a plurality of planar positive electrodes (2) and negative electrodes (3) are alternately laminated. The lamination type secondary battery includes a plurality of pairs of separators (4'), an intermittent joining section (6), and an outer periphery joining section (7). Each pair of separators (4') sandwiches and coats at least one among from the positive electrodes (2) and the negative electrodes (3). The intermittent joining section (6) is arranged at predetermined intervals along an outer periphery of each of the positive electrodes (2) or each of the negative electrodes (3). The intermittent joining section (6) is a section that joins the pair of separators (4'). The outer periphery joining section (7) partly joins the outer peripheries of the pair of separators (4') such that the outer periphery joining section (7) is harder than the other sections.

12 Claims, 6 Drawing Sheets

(56) References Cited

FOREIGN PATENT DOCUMENTS

| JP | 2002-252023 A |   | 9/2002 |
| --- | --- | --- | --- |
| JP | 2002252023 A | * | 9/2002 |
| JP | 2003-017112 A |   | 1/2003 |
| JP | 2003017112 A | * | 1/2003 |
| JP | 2003-092100 A |   | 3/2003 |
| JP | 2004-014528 A |   | 1/2004 |
| JP | 2007-250319 A |   | 9/2007 |

OTHER PUBLICATIONS

Communication dated Mar. 31, 2014 from the State Intellectual Property Office of P.R. China in counterpart Application No. 201080063549.5.

Office Action dated Apr. 8, 2014, issued by the Japan Patent Office in corresponding Japanese Application No. 2010-027055.

* cited by examiner

LAMINATION TYPE SECONDARY BATTERIES

CROSS REFERENCE TO RELATED APPLICATIONS

This application is a National Stage of International Application No. PCT/JP2010/072546 filed Dec. 15, 2010, claiming priority based on Japanese Patent Application No. 2010-027055, filed Feb. 10, 2010, the contents of all of which are incorporated herein by reference in their entirety.

TECHNICAL FIELD

The present invention relates to lamination type secondary batteries.

BACKGROUND ART

Various types of batteries are known. Among them, non-aqueous electrolyte batteries such as lithium ion batteries as well as nickel cadmium batteries, nickel hydrogen batteries, and lead battery have been increasingly used as batteries that have large energy densities.

Regarding the different structures of batteries, lamination type batteries as well as cylindrical batteries and square batteries are known. A cylindrical battery has a structure in which a cylindrically-shaped battery element that is composed of belt-shaped positive and negative electrodes and that is wound through a separator is contained in a battery case. A square battery has a structure in which such a wound battery element is flattened and contained in a square battery case. A lamination type battery has a structure in which a plurality of planar positive and negative electrodes are laminated through respective separators and current collection tabs connected to respective electrodes are connected in parallel.

In a battery having a winding type battery element using belt-shaped positive and negative electrodes, the battery element can be easily produced in such a manner that current collection tabs are connected to a negative electrode and a positive electrode and then the separator, negative electrode, separator, and then positive electrode are successively laminated and wound. On the other hand, such batteries have a problem in which, when the separators, negative electrode, and positive electrode are wound, they may be bent, active mass layers of the positive electrode and negative electrode become thick at sections where the radius of curvature becomes small and thereby current concentrates in these areas. In addition, since force that acts in the reverse direction of the winding direction occurs, it is necessary to prevent the winding type battery element from returning to their original positions. In addition, when a winding type battery element needs to be charged or discharged with a large amount of current, a plurality of current collection tabs are connected to the electrodes and wound. In this case, since the shape of the wound battery element becomes distorted, a problem sometimes occurs in the connection between the current collection tabs and the external connection terminals.

On the other hand, in a lamination type battery in which many planar electrodes are laminated, when the battery is charged or discharged, the volume of active mass varies only in the lamination direction. Such a volume change does not largely affect the battery. In addition, since the current collection tabs formed in the individual electrodes of the battery element can be accurately and easily connected, a small battery having a low current capacity can be easily produced. Moreover, since current collection tabs that have a large current conduction area can be used, a large battery that is charged and discharged with a large amount of current can be easily produced. As a result, a lamination type battery can be widely applied to batteries of various sizes.

A bag-shaped separator that coats a planar electrode has been used as a separator that separates adjacent planar negative electrode and positive electrode. When such a bag-shaped separator is produced, a microporous film made of a synthesize resin such as polyethylene or polypropylene is formed in a bag shape, a positive electrode or negative electrode to which a current conduction and connection tab is connected is contained in the bag shaped film, and then the opening section of the bag is closed by heat fusing. Although the bag-shaped separator becomes an effective means for preventing active material from peeling off from a planar electrode contained in the bag separator and dispersing, when the opening section is closed by heat fusing, the bag-shaped separator sometimes becomes wrinkled.

Thus, when a lamination type battery in which many bag-shaped separators are laminated is produced, it is likely that, since the separators become wrinkled and thereby the distance between laminated electrodes partly increases, various types of characteristics such as heavy load characteristic, cycle characteristic, and low temperature characteristic of the battery deteriorate.

If a heat fusing and joining section are equally and entirely formed on the periphery of the bag-shaped separator, it is likely that the strength of the heat fusing and joining section or its neighboring sections will weaken and thus the inner electrode will cause the bag to break.

To solve such a problem caused by the bag-shaped separator, a technique for forming the heat fusing and joining section on a part of the separator, but not on the entire area of the separator, has been proposed in a related art reference. Another technique that fuses and joins a separator at positions symmetrical with respect to the center line of an electrode has been proposed in another related art reference.

For example, Patent Literature 1 (JP7-272761A publication) describes that two separators sandwich one or more electrode plates from among a positive electrode plate and a negative electrode plate and the two separators are fused and joined together at predetermined intervals on the periphery of the positive electrode plate or negative electrode plate.

Patent Literature 2 (JP10-188938A, Publication) describes that in a secondary battery in which positive electrode plates and negative electrode plates are alternatively laminated through respective separators, two separators sandwich a positive electrode plate or a negative electrode plate and the two separators are fused and joined together at positions on the periphery with respect to the center line of the positive electrode plate or negative electrode plate including four corners of the positive electrode plate or negative electrode plate.

Figure 1:
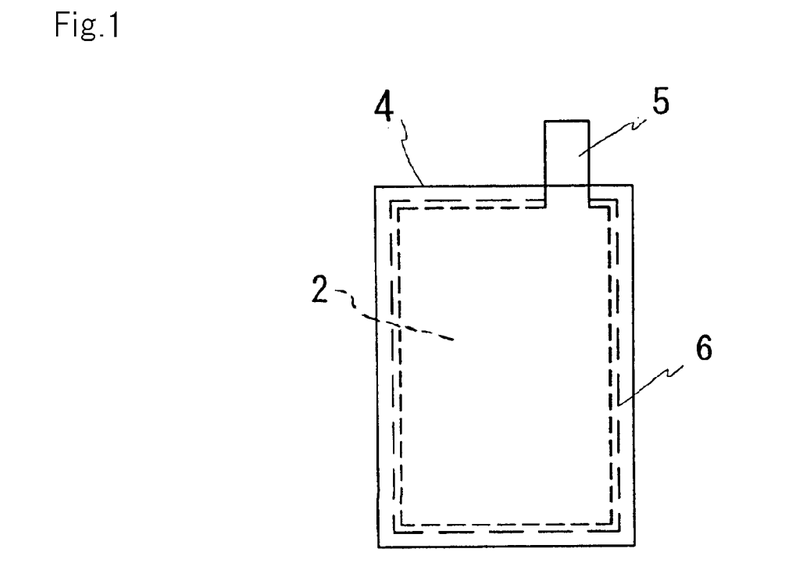
FIG. 1 is a schematic diagram showing an ordinary lamination type secondary battery.

Next, with reference to the accompanying drawings, an ordinary lamination type secondary battery will be described more specifically. FIG. 1 is a plan view showing an ordinary lamination type secondary battery. Positive electrode 2 or negative electrode (not shown) that composes a battery element of the lamination type battery is coated with bag-shaped separator 4. Bag-shaped separator 4 has a construction in which the electrode is sandwiched by two separators made of a microporous film such as polyethylene or polypropylene and fusing and joining section 6 that is intermittently formed along the outer periphery of the electrode joins the two separators so as to form them into a bag shape.

However, in the related art reference shown in FIG. 1, a section that has the strength for a baseline based on which bag-shaped separators are laminated is not present on the outer periphery of each bag-shaped separator. Thus, although the alignment accuracy of an electrode in one bag-shaped separator can be adjusted, when positive electrodes, separators, and negative electrodes are laminated for a plurality of pairs, there is no improvement in the accuracy for laminating the separators, and thereby it is likely laminating dislocation will occurs in separators.

When a battery case is used to contain a battery element, if laminating dislocation occurs in separators, the battery element becomes thick and the battery element may not fit the battery case. This problem may occur in the case that a laminate film is used as a member that covers a battery element. In this case, it is possible to contain the battery element in such a manner that the section of the laminate film that contains the battery element has a tolerance for laminating dislocation. However, in this case, a problem in which energy density per unit volume decreases will occur.

RELATED ART LITERATURE

Patent Literature

Patent Literature 1: JP7-272761A, Publication
Patent Literature 2: JP10-188938A, Publication

SUMMARY OF THE INVENTION

The present invention provides lamination type secondary batteries that can solve the foregoing problems that occur in the foregoing related art references. An object of the present invention is, for example, to prevent separators from becoming wrinkled and laminating dislocation from occurring in separators and thereby improve accuracy in laminating the separators when at least one among from a positive electrode and a negative electrode of a lamination type secondary battery is coated with a bag-shaped separator. Another object of the present invention is to prevent laminating dislocation from occurring in separators and thereby prevent the thickness of the battery from increasing and the energy density from becoming lower.

An aspect of the present invention is a lamination type secondary battery in which a plurality of planar positive electrodes and negative electrodes are alternately laminated. The lamination type secondary battery includes a plurality of pairs of separators, an intermittent joining section, and an outer periphery joining section. Each pair of separators sandwiches and coats at least one among from the positive electrodes and the negative electrodes. The intermittent joining section is arranged at predetermined intervals along an outer periphery of each of the positive electrodes or each of the negative electrodes. The intermittent joining section is a section that joins the pair of separators. The outer periphery joining section partly joins the outer peripheries of the pair of separators such that the outer periphery joining section is harder than the other sections.

In a bag-shaped separator composed of a pair of separators that sandwich and join a positive electrode or a negative electrode, since a joining section is formed intermittently on the periphery of the electrode, the separators can be prevented from getting wrinkled. In addition, since the outer peripheries of the pair of separators are partly joined, the outer periphery joining section on the outer peripheries hardens and becomes stronger than the other sections. Thus, electrodes can be laminated based on the hardened outer periphery joining section and the current collection tabs. As a result, laminating dislocation can be prevented from occurring in electrodes and separators. Moreover, since laminating dislocation is prevented from occurring in electrodes, various types of characteristics such as heavy load characteristics, cycle characteristics, and low temperature characteristics of the battery can be prevented from deteriorating.

BRIEF DESCRIPTION OF DRAWINGS

FIG. 2b is a plan view showing a bag-shaped separator that coats an electrode shown in FIG. 2a.

BEST MODES THAT CARRY OUT THE INVENTION

Next, with reference to the accompanying drawings, embodiments of the present invention will be described.

Figure 2A:
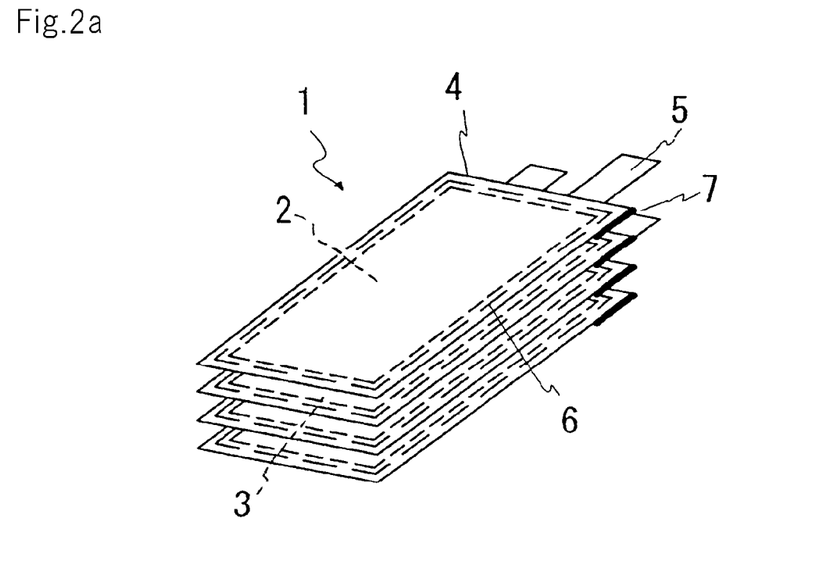
FIG. 2a is a perspective view showing a battery element of a lamination type secondary battery according to an embodiment of the present invention.
Figure 2B:
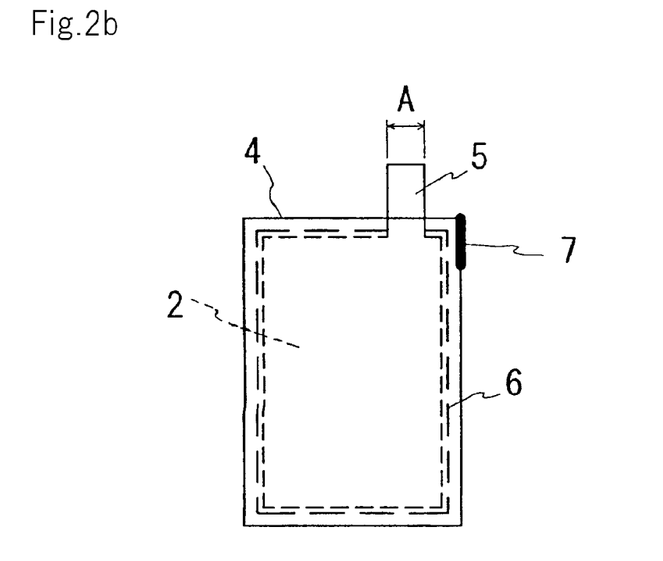

FIG. 2a is a perspective view showing a battery element of a lamination type secondary battery according to an embodiment of the present invention; FIG. 2b is a plan view showing a bag-shaped separator that coats an electrode shown in FIG. 2a. As depicted in these drawings, in battery element 1, bag-shaped separator 4 coats positive electrode 2 or negative electrode 3. Bag-shaped separators 4 that each coat positive electrode 2 and bag-shaped separators 4 that each coat negative electrode 3 are alternately laminated. Each of electrodes 2 and 3 has current collection tab 5. Current collection tab 5 extends from a predetermined side of each tag-shaped separator 4.

In bag-shaped separator 4 that coats positive electrode 2, two separators made of microporous films sandwich positive electrode 2 and fusing and joining section 6 that are formed at predetermined intervals along the outer periphery of positive electrode 2 heat fuse and join the two separators so as to form the separators in a bag shape. Similarly, bag-shaped separator 4 coats negative electrode 3. Two separators that sandwich negative electrode 3 are joined together by fusing and joining sections 6 formed at predetermined intervals along the outer periphery of negative electrode 3. Fusing and joining section 6 corresponds to an intermittent joining section described in the scope of claim.

Outer periphery fusing and joining section 7 is formed by fusing and joining part of the outer periphery of bag-shaped separator 4 outside fusing and joining sections 6 such that outer periphery fusing and joining section 7 is greater than horizontal width A of current collection tab 5. Outer periphery fusing and joining section 7 corresponds to an outer periphery joining section described in the scope of claim.

Since outer periphery fusing and joining section 7 hardens and becomes stronger than other sections, when electrodes and separators are laminated based on current collection tab 5 and outer periphery fusing and joining section 7, it is unlikely that laminating dislocation occurs in electrodes and separators. This is because two sections (outer periphery fusing and joining section 7 and current collection tab 5) that harden and that become stronger than the material of bag-shaped separator 4 can be used as a baseline based on which electrodes and separators are laminated.

When the entire length of outer periphery fusing and joining section 6 is greater than horizontal width A or the length in the extension direction of current collection tab 5, whichever is shorter, bag-shaped separators 4 can be easily aligned and laminated.

In the structure according to this example, since outer periphery fusing and joining section 7 is formed partly on the outer periphery of bag-shaped separator 4, when positive electrode 2 and negative electrode 3 are laminated, it is unlikely that laminating dislocation will occur in bag-shaped separators 4. In addition, when laminating dislocation is prevented from occurring in electrodes, various types of characteristics such as heavy load characteristics, cycle characteristics, and low temperature characteristics of the lamination type secondary battery can be prevented from deteriorating.

Moreover, in the lamination type secondary battery according to this embodiment, when fusing and joining section 6 is formed on bag-shaped separator 4, since fusing and joining sections 6 is intermittently formed on separators, fusing and joining sections 6 prevents the separators from excessively shrinking and thereby prevents them from becoming wrinkled. As a result, as compared with what fusing and joining sections 6 are formed on the entire periphery, separators can be easily adhered together.

Fusing and joining section 6 and outer periphery fusing and joining section 7 together prevent separator material from shrinking and complement the strength of the bag. As a result, when the battery temperature rises, electrodes of neighboring bag-shaped separators 4 can be prevented from shortcircuiting.

It should be noted that positive electrodes and negative electrode do not need to be square, but can be in any shape. Likewise, separators do not need to be square, but polygonal.

Figure 3:
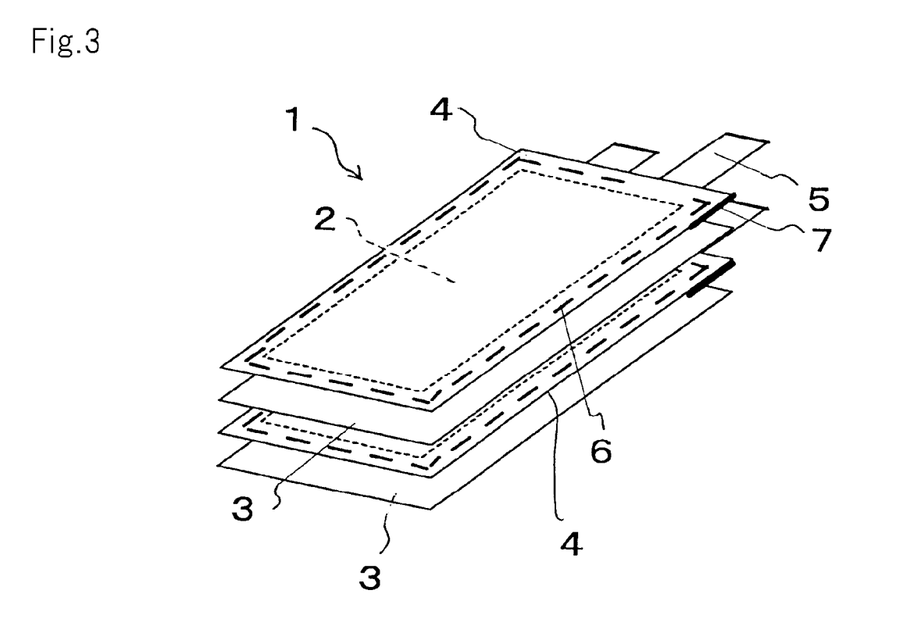
FIG. 3 is a perspective view showing a battery element of a lamination type secondary battery according to another embodiment of the present invention.

The foregoing embodiment described that bag-shaped separators coat the positive electrode or the negative electrode. Alternatively, as shown in FIG. 3, bag-shaped separator 4 may coat either the positive electrode or negative electrode. Further alternatively, outer periphery heat fusing and joining section 7 may be intermittently formed as long as the entire length of outer periphery fusing and joining section 7 is greater than horizontal width A or the length in the extension direction of current collection tab 5, whichever is shorter. Alternatively, outer periphery fusing and joining section 7 may be a tape or may be formed by folding one side of bag-shaped separator 4 a plurality of times so as to harden bag-shaped separator 4.

FIGS. 4a, 4b, 4c, and 4d are schematic diagrams describing bag-shaped separators that coat an electrode according to other embodiments of the present invention.

In square bag-shaped separators 4 shown in FIGS. 4a to 4d, two separators that sandwich positive electrode 2 are joined by fusing and joining section 6 formed at predetermined intervals along the outer periphery of positive electrode 2.

Figure 4A:
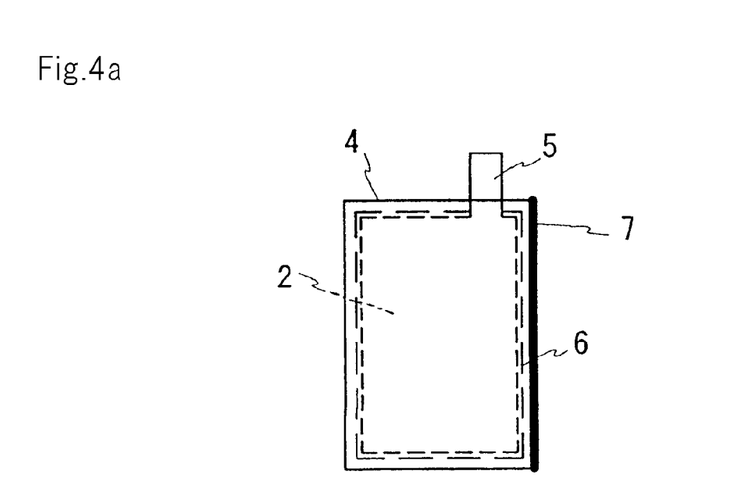
FIG. 4a is a plan view showing a bag-shaped separator that coats an electrode and that has an outer periphery fusing and joining section formed on one side according to another embodiment of the present invention.

In bag-shaped separator 4 shown in FIG. 4a, two separators are fused and joined together entirely on one longer side of four sides other than one side from which current collection tab 5 extends so as to form outer periphery fusing and joining section 7. Since outer periphery fusing and joining section 7 is fused and joined together, it is harder than other sections. Thus, outer periphery fusing and joining section 7 can be used as a section having the strength as a baseline based on which bag-shaped separators 4 are laminated. As a result, when bag-shaped separators 4 are laminated based on both current collection tab 5 and outer periphery fusing and joining section 7 formed on different sides, laminating dislocation can be prevented from occurring in electrodes and separators.

Figure 4B:
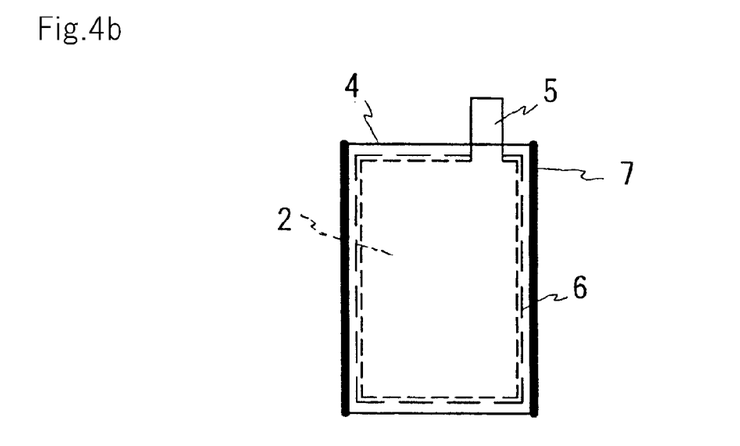
FIG. 4b is a plan view showing a bag-shaped separator that coats an electrode and that has an outer periphery fusing and joining section formed on two sides according to another embodiment of the present invention.

In bag-shaped separator 4 shown in FIG. 4b, two separators are fused and joined together on two longer sides of four sides other than one side from which current collection tab 5 extends so as to form outer periphery fusing and joining section 7. Like bag-shaped separator 4 shown in FIG. 4a, when bag-shaped separators 4 are laminated based on current collection tab 5 and outer periphery fusing and joining section 7 formed on different sides, laminating dislocation can be prevented from occurring in electrodes and separators. Alternatively, outer periphery fusing and joining section 7 may be formed on two neighboring sides.

Figure 4C:
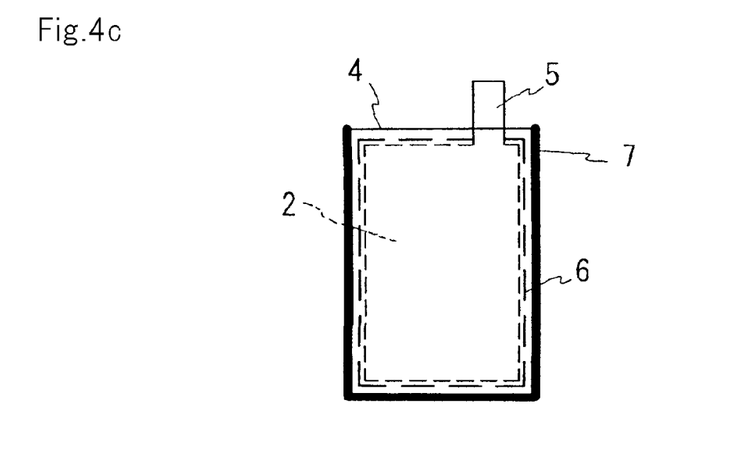
FIG. 4c is a plan view showing a bag-shaped separator that coats an electrode and that has an outer periphery fusing and joining section formed on three sides according to another embodiment of the present invention.

In bag-shaped separator 4 shown in FIG. 4c, two separators are fused and joined together on all sides (three sides in FIG. 4c) other than one side from which current collection tab 5 extends so as to form outer periphery fusing and joining section 7. Like bag-shaped separator 4 shown in FIG. 4a, when bag-shaped separators 4 are laminated based on current collection tab 5 and outer periphery fusing and joining section 7 that are formed on different sides, laminating dislocation can be prevented from occurring in electrodes and separators.

Figure 4D:
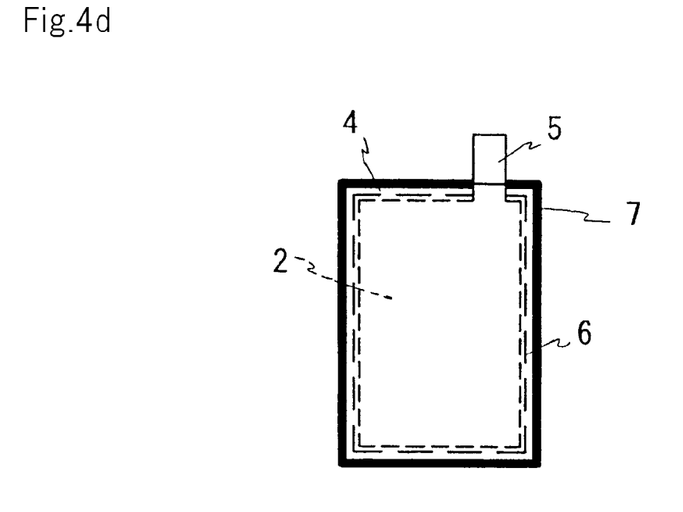
FIG. 4d is a plan view showing a bag-shaped separator that coats an electrode and that has an outer periphery fusing and joining section formed on the outer periphery other than a section from which a current collection tab extends according to another embodiment of the present invention.

In bag-shaped separator 4 shown in FIG. 4d, two separators are fused and joined together on four sides other than a section from which current collection tab 5 extends so as to form outer periphery fusing and joining section 7. Like bag-shaped separator 4 shown in FIG. 4a, when bag-shaped separators 4 are laminated based on current collection tabs 5 and outer periphery fusing and joining sections 7 formed on different sides, laminating dislocation can be prevented from occurring in electrodes and separators. In the construction shown in FIG. 4d, active material that peels off from an electrode can be prevented from flowing out.

In the foregoing lamination type secondary batteries, since bag-shaped separator 4 that coats positive electrode 2 or negative electrode 3 needs to be joined by fusing and joining sections 6 formed intermittently with sufficient strength, fusing and joining section 6 needs to be formed with sufficient temperature and pressure that allow separators to be sufficiently fused and joined together. In contrast, since outer periphery fusing and joining section 7 is used to laminate bag-shaped separators 4, it does not need to have a stronger joining force than fusing and joining section 6. The fusing and joining strength of outer periphery fusing and joining section 7 may not exceed the strength of fusing and joining section 6.

Figure 5:
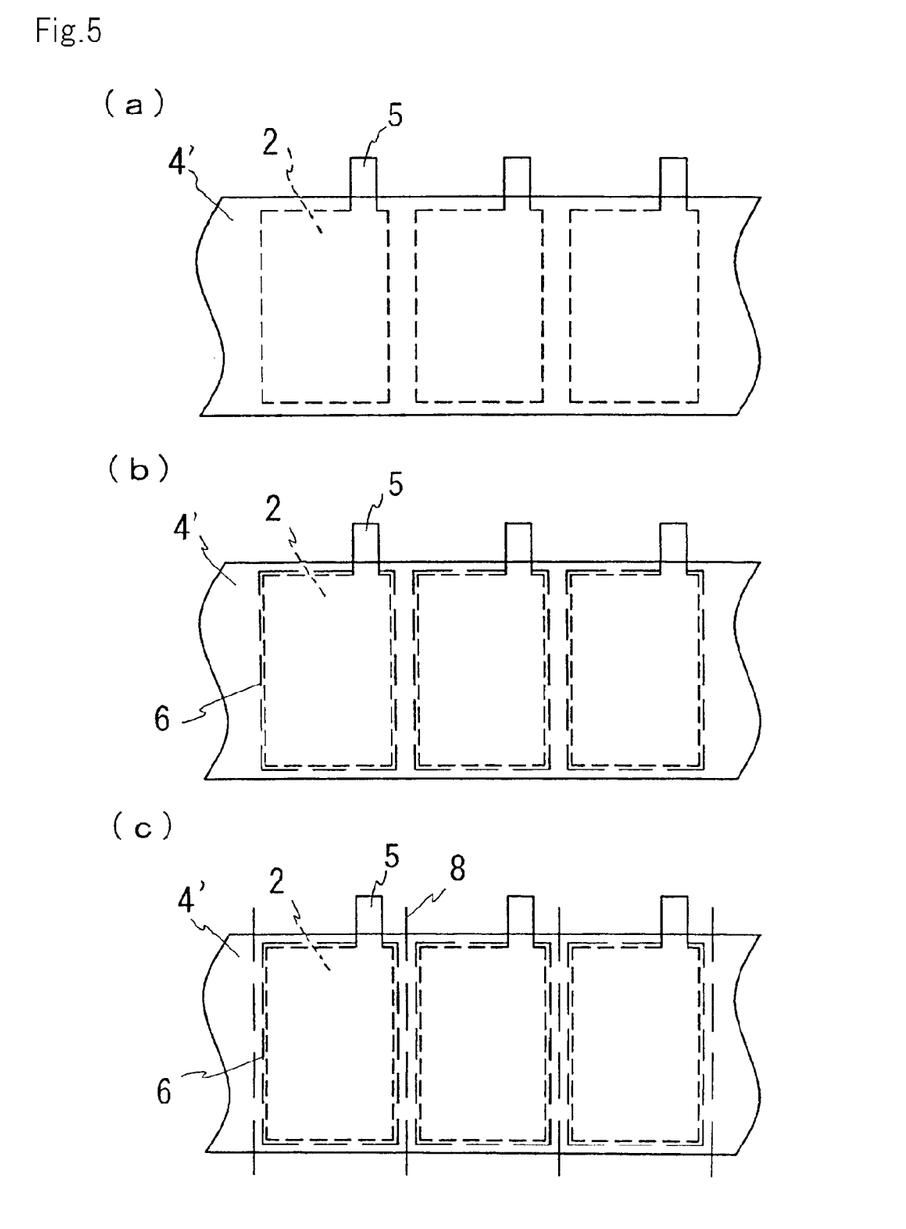
FIG. 5 is a schematic diagram showing an example of a production process for a lamination type secondary battery according to the present invention.

FIGS. 5(a) to 5(c) are schematic diagrams showing a production process for bag-shaped separators having electrodes. In particular, FIG. 5(a) shows a step at which an electrode is arranged between belt-shaped separators, FIG. 5(b) shows a step at which fusing and joining section 6 is formed on the separators, and FIG. 5(c) shows a step at which the separators are heat cut.

As shown in FIG. 5(a), positive electrodes 2 are arranged at predetermined intervals between two belt-shaped separators 4'. As shown in FIG. 5(b), belt-shaped separators 4' are fused and joined together at predetermined intervals along the outer periphery of positive electrode 2 so as to form fusing and joining sections 6. Belt-shaped separators 4' may be joined together in any method such as heat fusing and joining, ultrasonic fusing, radio frequency fusing, adhesive agent, or the like. Finally, as shown in FIG. 5(c), belt-shaped separators 4' are heat cut along cut line 8 so as to form outer periphery fusing and joining section 7 along cut line 8. Alternatively, after outer periphery fusing and joining section 7 is formed, belt-shaped separators 4' may be cut or after belt-shaped separators 4' are cut, outer periphery fusing and joining section 7 may be formed.

Between the forming step for fusing and joining section 6 and the forming step of outer periphery fusing and joining section 7 and between the forming step for outer periphery fusing and joining section 7 and the cutting step for belt-shaped separators 4', it is preferred to cool belt-shaped separators 4'. When belt-shaped separators 4' are cooled between such steps, heat deformation of belt-shaped separators 4' can be reduced.

The foregoing embodiment described that two belt-shaped separators 4' were arranged on the front and rear of an electrode and formed in a bag shape. Alternatively, one belt-shaped separator 4 may be folded such that it coats both surfaces of an electrode and then fuses and joins the overlapped section of the separator so as to form it into a bag shape.

The lamination type secondary batteries of the present invention can be applied to various types of batteries. Next, the case in which the present invention is applied to lithium ion batteries will be described.

Examples of material of active matter of the positive electrode include those that can be doped with lithium ions and from which they are dedoped, such as lithium cobalt oxide, lithium manganese oxide, lithium nickel oxide, and lithium iron phosphate; transition metal lithium complex oxides such as lithium cobalt-nickel oxide; metal chalcogenids such as lithium-titanium disulfide, lithium-molybdenum sulfide, lithium and niobium selenide; organic compounds such as polypyrrole, polythiophene, polyaniline, polyacene compounds, polyacetylene, polyarylenevinylene, dithiol derivatives, and disulfide derivatives; and mixtures thereof. Examples of material of the current collector of positive electrode may be metals including aluminum, alloys thereof, and titanium.

Examples of material of negative electrode include carbon materials that can be doped with lithium ions and from which they are dedoped such as graphite and amorphous carbon; and tin-silicon complex oxides. Examples of material of the current collector of the negative electrode are metals that include copper, nickel, and their alloys. Bag-shaped separator 4 of the present invention that coats a positive electrode or a negative electrode may be a film made of porous polyethylene, polypropylene, or the like.

Bag-shaped separators produced as described above can be used for batteries in which laminated electrodes are contained in a metal battery case and batteries in which laminated electrodes are coated with a flexible material.

Next, the structures of the foregoing separators will be described with specific values.

Specific Example 1

An electrode mix layer was coated on both surfaces of a rectangular aluminum foil having a vertical length of 94 mm, a horizontal width of 64 mm, and a thickness of 20 μm so as to produce a positive electrode. A current collection tab having a vertical length of 30 mm and a horizontal width of 10 mm was welded to one shorter side of the positive electrode.

An electrode mix layer was coated on both surfaces of a rectangular copper foil having a vertical length of 100 mm, a horizontal width of 70 mm, and a thickness of 10 μm so as to produce a negative electrode. A current collection tab having a vertical length of 30 mm and a horizontal width of 10 mm was welded to one sorter side of the negative electrode.

Thereafter, a plurality of positive electrodes were arranged at predetermined intervals between two belt-shaped separators each having a length of 105 mm. The belt-shaped separators were fused and joined together at predetermined intervals along the outer periphery of each positive electrode so as to form fusing and joining section 6. The belt-shaped separators were cut along cut lines formed between the positive electrodes so as to obtain a plurality of separators 4 that each contain a positive electrode. The bag-shaped separators were heat cut along the cut lines such that outer periphery fusing and joining section 7 was formed partly on each bag-shaped separator.

The bag-shaped separators that each contain a positive electrode were formed with a vertical length of 105 mm and a horizontal width of 75 mm. Outer periphery fusing and joining section 7 was formed on one longer side of each bag-shaped separator with a length of 15 mm.

A plurality of negative electrodes were arranged at predetermined intervals between two bag-shaped separators each having a length of 105 mm. The belt-shaped separators arranged at predetermined intervals were fused and joined together along the outer periphery of a negative electrode so as to form fusing and joining section 6. The belt-shaped separators were cut along cut lines between negative electrodes so as to obtain a plurality of bag-shaped separators 4 that each contain a negative electrode. The belt-shaped separators were heat cut such that outer periphery fusing and joining section 7 was formed partly on the belt-shaped separator along the cut line.

The bag-shaped separators that each contain a negative electrode were formed with a vertical length of 105 mm and a horizontal width of 75 mm. Outer periphery fusing and joining section 7 was formed on one side in the vertical direction of the bag-shaped separator with a length of 15 mm.

Finally, bag-shaped separators that each coat the negative electrode and bag-shaped separators that each coat the positive electrode were alternately laminated such that a bag-shaped separator that contains the negative electrode was formed as the uppermost layer. As a result, a battery element was produced. The number of negative electrode layers was 14, whereas the number of positive electrode layers was 13.

After production of the battery element, the battery element was enclosed in a bag made of an aluminum laminate film, the bag was filled with an electrolytic solution and then airtightly sealed. 50 lamination type secondary batteries of this type were produced.

The aluminum laminate film had a vertical length of 120 mm and a horizontal width of 80 mm. In addition, the aluminum laminate film had a concave-shaped section that contained the battery element. The concave-shaped section had a vertical length of 105 mm and a horizontal width of 75 mm.

Specific Example 2

50 lamination type secondary batteries were produced in the same manner as the foregoing specific example 1 except that the negative electrode was not coated with a bag-shaped separator.

Comparison Example 50 lamination type secondary batteries were produced in the same manner as the foregoing specific example 1 except that outer periphery fusing and joining section 7 was not formed on each bag-shaped separator that coats the negative electrode.

Result of Cycle Characteristic Tests in the Case that Laminating Dislocation Occurs in Electrodes and in the Case that it does not Occur Cycle characteristic tests were conducted for lamination type secondary batteries in which it was confirmed that laminating dislocation has not occurred in the electrodes and was conducted for those lamination type secondary batteries in which it was confirmed that laminating dislocation had occurred in the electrodes. The lamination type secondary batteries used for the tests had the same structure as the foregoing specific example 1.

Figure 6:
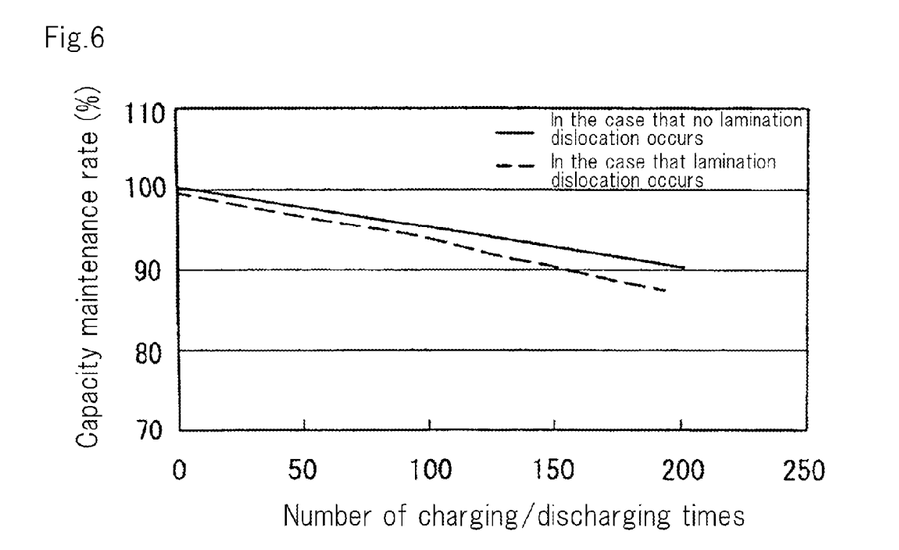
FIG. 6 is a schematic diagram showing the relationship between the number of charging/discharging times and the capacity maintenance rate in the cases where laminating dislocation occurs in electrodes and in cases where no laminating dislocation occurs.

The batteries were charged according to the constant voltage and constant current method. Specifically, the batteries were charged with a constant voltage of 4.2 V and a constant current of 4 A for 2.5 hours. On the other hand, the batteries were discharged with a constant current of 4 A until the voltage became 3.0 V. Under an ambient temperature of 20° C., this charging and discharging were repeated for 200 cycles. FIG. 6 shows the result of the cycle characteristic tests.

FIG. 6 is a graph showing the relationship between the number of charging/discharging times and the capacity maintenance rate in the case in which laminating dislocation occurs in electrodes and in the case in which it does not occur. FIG. 6 shows that the capacity maintenance rate of batteries in the case in which laminating dislocation occurs in electrodes is lower than that in the case in which it does not occur.

Evaluation Method

Cycle characteristic tests were conducted for 200 cycles for each of 50 lamination type secondary batteries with respect to the foregoing specific example 1, specific example 2, and comparison example. Thereafter, the lamination type secondary batteries were disassembled and checked regardless of whether or not lamination dislocation had occurred in the separators.

Test Result

With respect to the foregoing specific examples 1 and 2, the capacity maintenance rate of each battery exceeded 90% and the disassembled lamination type secondary batteries showed that no laminating dislocation had occurred in separators and they did not become wrinkled. In contrast, with respect to the comparison example, there were three lamination type secondary batteries respectively having capacity maintenance rates of 85%, 87%, and 82%. The disassembled lamination type secondary batteries showed that lamination dislocation had occurred in separators and they had become wrinkled.

Thus, it was confirmed that laminating dislocation has not occurred in the electrodes and separators of the lamination type secondary batteries of the present invention. As a result, according to the present invention, it was confirmed that lamination type secondary batteries free of lamination dislocation in electrodes and separators could be provided.

With reference to the embodiments, the present invention has been described. However, it should be understood by those skilled in the art that the structure and details of the present invention may be changed in various manners without departing from the scope of the present invention. In other words, various types of modifications and corrections that those skilled in the art can undertake are included in the present invention.

The present application claims priority based on Japanese Patent Application JP 2010-027055 filed on Feb. 10, 2010, the entire contents of which are incorporated herein by reference in its entirety.

DESCRIPTION OF REFERENCE NUMERALS

1 Battery element
2 Positive electrode
3 Negative electrode
4 Bag-shaped separator
4' Belt-shaped separators
5 Current collection tab
6 Fusing and joining section (intermittent joining section)
7 Outer periphery fusing and joining section (outer periphery joining section)
8 Cut lines
A Width of current collection tab

The invention claimed is:

1. A lamination type secondary battery in which a plurality of planar positive electrodes, each comprising a current collection tab, and a plurality of planar negative electrodes, each comprising a current collection tab, are alternately laminated, the lamination type secondary battery comprising:
  a plurality of pairs of separators, each pair of separators sandwiching and coating at least one electrode from among said positive electrodes and said negative electrodes;
  an intermittent joining section that is arranged at predetermined intervals along an outer periphery of each of said positive electrodes or each of said negative electrodes, said intermittent joining section being a section that joins each separator of said pair of separators to each other; and
  an outer periphery joining section that is made by joining a part of an edge of each of the separators of said pairs of separators to each other, said outer periphery joining section being formed on all sides of said separators,
  wherein the all sides of said separators on which said outer periphery joining section is formed includes at least one side from among all sides except for a side through which said current collection tab extends,
  wherein said outer periphery joining section is located outside said intermittent joining section with respect to the center of each of the separators of said pair of separators, and
  wherein a non-joining section in which the separators of said pairs of separators are not joined to each other is located between said intermittent joining section and said outer periphery joining section.

2. The lamination type secondary battery as set forth in claim 1,
  wherein the current collection tab of each of said positive electrodes and each of said negative electrodes extends from one side thereof, and wherein said outer periphery joining section is longer than the length in the extension direction of said current collection tab or the width of said current collection tab perpendicular to the extension direction, whichever is shorter.

3. The lamination type secondary battery as set forth in claim 1,
wherein said outer periphery joining section is formed by partly heat fusing and joining the edge of each of the separators of said pair of separators.

4. The lamination type secondary battery as set forth in claim 1,
wherein said intermittent joining section is formed by heat fusing and by joining said pair of separators.

5. The lamination type secondary battery as set forth in claim 1,
wherein said intermittent joining section is formed by adhering said pair of separators with an adhesive agent.

6. The lamination type secondary battery as set forth in claim 1,
wherein said pair of separators are composed of two rectangular or square separators.

7. The lamination type secondary battery as set forth in claim 1,
wherein said pair of separators are composed of part of one rectangular or square separator that is folded and overlapped.

8. A lamination type secondary battery in which a plurality of planar positive electrodes, each comprising a current collection tab, and a plurality of planar negative electrodes, each comprising a current collection tab, are alternatively laminated, the lamination type secondary battery comprising;
a plurality of pairs of separators, each pair of separators sandwiching and coating at least one electrode from among said positive electrodes and said negative electrodes;
an intermittent joining section that is arranged at predetermined intervals along an outer periphery of each of said positive electrodes or each of said negative electrodes, said intermittent joining section being a section that joins each separator of said pair of separators to each other; and
an outer periphery joining section that is made by joining a part of an edge of each of the separators of said pairs of separators to each other, said outer periphery joining section being formed on at least one side from among all sides except for a side through which said current collection tab extends,
wherein said outer periphery joining section is located outside said intermittent joining section with respect to the center of each of the separators of said pair of separators, and
wherein a non-joining section in which the separators of said pairs of separators are not joined to each other is located between said intermittent joining section and said outer periphery joining section.

9. The lamination type secondary battery as set forth in claim 8,
wherein said outer periphery joining section is formed entirely on any one of the sides of each of the separators of said pair of separators.

10. The lamination type secondary battery as set forth in claim 8,
wherein said outer periphery joining section is formed entirely on any two of the sides of each of the separators of said pair of separators.

11. The lamination type secondary battery as set forth in claim 8,
wherein said outer periphery joining section is formed entirely on any three of the sides of each of the separators of said pair of separators.

12. The lamination type secondary battery as set forth in claim 8,
wherein said outer periphery joining section is formed entirely on the outer periphery other than a section from which said current collection tab extends of each of the separators of said pair of separators.

* * * * *